United States Patent [19]

Urbach

[11] 3,985,697

[45] Oct. 12, 1976

[54] HYDROPHILIC CONTACT LENS MATERIAL

[75] Inventor: Jacques Urbach, North Hollywood, Calif.

[73] Assignee: Uroptics International Incorporated, Los Angeles, Calif.

[22] Filed: May 20, 1974

[21] Appl. No.: 471,575

Related U.S. Application Data

[63] Continuation-in-part of Ser. No. 298,511, Oct. 18, 1972, abandoned.

[52] U.S. Cl. .................. 260/29.6 TA; 260/486 R; 264/1; 351/160
[51] Int. Cl.² .................. C08L 29/02; C08F 216/04
[58] Field of Search .............. 260/80.75, 29.6 TA; 264/1; 526/317

[56] References Cited
UNITED STATES PATENTS

| | | | |
|---|---|---|---|
| 3,598,770 | 8/1971 | Moore et al. | 260/2.5 |
| 3,780,003 | 12/1973 | Seymour et al. | 260/86.1 E |
| 3,850,892 | 11/1974 | Shen et al. | 260/80.75 |

*Primary Examiner*—Stanford M. Levin
*Attorney, Agent, or Firm*—Howard A. Silber

[57] ABSTRACT

A terpolymer material for the formation of soft contact lenses includes a major amount of hydroxy alkyl acrylate or methacrylate, between 0.01 and 0.25% of a diester cross-linking agent containing acrylic or methacrylic groups and having no free hydrophilic groups, and between about 0.5 and 10% of a free acid (typically acrylic or methacrylic acid) having an unsaturated double bond. The material is polymerized in the non-aqueous state to form a rigid terpolymer having physical characteristics established by the diester concentration. The non-hydrated terpolymer can be formed into a contact lens using conventional lens grinding techniques. Upon subsequent hydration, the water concentration of the terpolymer is determined by the free acid concentration in the starting composition.

13 Claims, No Drawings

HYDROPHILIC CONTACT LENS MATERIAL

RELATED APPLICATIONS

This application is a continuation-in-part of the inventor's copending U.S. application Ser. No. 298,511 filed Oct. 18, 1972, now abandoned.

BACKGROUND OF THE INVENTION

1. Field of the Invention

The present invention relates to a material for the formation of hydrophilic contact lenses, and particularly to terpolymer hydrogels formed from a hydroxy alkyl acrylate or methacrylate together with very small amounts of a non-water soluble diester and a free acid.

2. Description of the Prior Art

Acceptable hydrophilic or "soft" contact lenses should exhibit certain desirable properties which in the past have been difficult to achieve or control. Preferably the hydrated lens should be strong yet flexible, so that if stretched, the lens will not tear, and will recover its original shape without distortion of the optical quality. The lens should have a low pH dependence, so that changes in the pH of tear fluids in the eye will not cause variation in the shape, water content or optical properties of the lens. Further, the lens material should exhibit consistent expansion upon hydration, to insure repeatability in the manufacturing process. One object of the present invention is to provide a soft contact lens material having these desirable qualities.

Another desirable feature, not heretofor possible, is the formation of soft contact lenses in which the water content is so great, typically about 60 to 80% by weight, that tear exchange with the cornea is not inhibited by the lens. Tear fluid does not stagnate under the lens. As a result, lenses of this type can be left in the eye for indefinitely long periods of time.

A known formulation for hydrophilic contact lens material is set forth by Wichterle and Lim in the U.S. Pat. Nos. 2,976,576 and 3,220,960. Three dimensional, sparingly cross-linked copolymer hydrogels are produced by polymerizing in aqueous solution a monomeric acrylic or methacrylic acid ester having a hydrophilic (e.g., hydroxy) ester moiety together with less than one mol percent of a water soluble diester formed from a polyhydroxylic alcohol having excess hydrophilic groups and an olefinic acid such as acrylic or methacrylic acid.

In the Wichterle and Lim copolymer material, properties of shape stability and swelling capacity both are altered by changing the ratio between the monomer and diester. This dual effect of the water-soluble diester concentration results since the diester plays two roles. First, it acts as the cross-linking agent, thereby establishing the physical properties of the hydrogel. Secondly, since the diester is water soluble and has excess hydrophilic groups, it increases the hydration capability of the hydrogel. However, there is no separate control of physical characteristics and hydration percentage, since a change in diester concentration alters both properties. An object of the present invention is to provide a hydrophilic polymer material in which shape stability and water content upon hydration can be controlled separately.

Another characteristic of the Wichterle and Lim material is that it is polymerized in aqueous solution. In other words, the monomer and water soluble diester constituents are premixed and reacted in a water solution. As a result, the hydrogel that is formed is already hydrated and soft. Lenses must be made by a molding process in which the material is polymerized within a lens-shaped mold. Conventional grinding techniques cannot be used. Another object of the present invention is to provide a hydrophilic material that is formed in the rigid, unhydrated state. This permits lens fabrication using conventional grinding techniques, with subsequent hydration.

Control of the physical properties of hydrophilic contact lens material also is discussed in the U.S. Pat. No. 3,503,942 to Maurice Seiderman. There, stiff but flexible hydrophilic plastic materials are produced by introducing a controlled, increased amount of cross-linking into the polymeric structure. This is accomplished by combining (a) an acid and inhibitor-free monomer of hydroxy alkyl acrylate or methacrylate, (b) a minor amount of up to about 35% by weight of alkyl acrylate or methacrylate wherein the alkyl group contains from 1 to about 20 carbon atoms, and (c) from 1% to about 50% by weight of a cross-linking monomer such as an acrylic diester. Addition of this longer chain alkyl methacrylate gives better polymer chain strength, and aids in restricting water swellability of the resultant product.

Another approach is taught in the U.S. Pat. No. 3,532,679 to Robert Steckler. There, transparent hydrogels having good shape or body retaining characteristics and good volume stability are produced by simultaneously copolymerizing and cross-linking a mixture of comonomers including N-vinyl lactam, an acrylate ester monomer and from about 0.5% to about 12% by weight of a diester cross-linking agent such as polyethylene glycol dimethacrylate.

Thus it is characteristic of the prior art to use relatively large amounts of diester cross-linking agent, together with an acid-free hydroxyalkyl monomer, to obtain hydrogel materials having physical properties acceptable for soft contact lenses. Additives such as a longer chain alkyl polymer, or a vinyl lactam than are used to control these properties. In contrast to the prior art, it has now been found that hydrophilic lenses having excellent stretch characteristics, low pH dependence and controllable expansion upon hydration advantageously are formed from compositions having a major portion of a hydroxy alkyl acrylate or methacrylate together with very small amounts of free acid (less than about 10% and preferably below about 1.5% for low pH dependence and optimum strength) and a diester cross-linking agent (preferably less than 0.25%) having no free hydrophilic groups. The principal object of this invention is to provide such improved materials and compositions. The physical properties of the resultant terpolymer are controlled by the concentration of diester, while the percentage of hydration of the material is separately controlled by the free acid concentration.

SUMMARY OF THE INVENTION

To achieve these objectives, terpolymer hydrogels are formed by combining a major amount of hydroxy alkyl acrylate or methacrylate, between 0.01 and 0.25% by weight of a non-water-soluble acrylate or methacrylate diester as a cross-linking agent, and between 0.15% and about 10% by weight of a free acid having an unsaturated double bond, typically acrylic acid or methacrylic acid. Such compositions, when polymerized by use of a catalyst, provide hydrophilic gels of sufficient rigidity to permit formation of contact lenses by conventional grinding or other techniques. When hydrated, the lenses absorb a consistent amount of water established by the free acid concentration in the starting material, and exhibit uniform expansion in each dimension. The resultant lenses have improved qualities of stretchability without tearing and low pH dependence.

The inventive compositions may be formed by distillation of commercial grade hydroxyethyl methacrylate (HEMA) which typically contains ethylene glycol dimethacrylate, methacrylic acid and ethylene glycol as impurities. Low temperature vacuum distillation is used to reduce the diester and free acid content to within or below the desired ranges, and additional free acid or diester is added if necessary to bring the concentrations within the specified range.

DESCRIPTION OF THE PREFERRED EMBODIMENTS

The following detailed description is of the best presently contemplated modes of carrying out the invention. This description is not to be taken in a limiting sense, but is made merey for the purpose of illustrating the general principles of the invention since the scope of the invention is best defined by the appended claims.

Structural and operational characteristics attributed to forms of the invention first described shall also be attributed to forms later described, unless such characteristics are obviously inapplicable or unless specific exception is made.

In accordance with the present invention, improved hydrophilic contact lenses may be fabricated from the polymerization product of a composition consisting of a major amount of hydroxy alkyl acrylate or methacrylate, a very small amount (between 0.01 and 0.25% by weight) of a non-water-soluble diester containing acrylic or methacrylic groups and having no free hydrophilic groups, and a very small amount (between 0.5% and about 10% by weight) of free acrylic acid, methacrylic acid or other acid having an unsaturated double bond. When polymerized using a conventional catalyst such as an organic peroxide, the composition forms a rigid hydrophilic gel material from which contact lenses may be fabricated using conventional grinding or other techniques. The terpolymer exhibits consistent expansion upon hydration. Lenses made from this terpolymer, may be stretched without tearing and will return to the original shape without loss of optical quality when the stretch force is released.

The following example is a typical composition in accordance with the present invention.

EXAMPLE I

| Hydroxyethyl methacrylate | 98.75 grams |
|---|---|
| Ethylene glycol dimethacrylate | 0.25 g |
| Methacrylic acid | 1.00 g |

When catalyzed using 0.10 grams of an organic peroxide catalyst, the composition of Example I polymerizes to form a hydrophilic material sufficiently rigid to permit a contact lens to be formed therefrom by conventional grinding techniques. Upon aqueous immersion, the lens absorbs an amount of water equal to approximately 47% by weight of the hydrated product. During such hydration, the lens expands uniformly in all dimensions, so that the optical qualities of the lens are not distorted. The amount of expansion upon hydration is consistent; that is, so long as the ingredient concentrations are the same, the polymer material will absorb the same weight percentage of water when hydrated.

Lenses formed from the composition of Example I exhibit very low pH dependence. For example, when immersed in a liquid having a pH of 9.0, the lenses will expand to be only 1.5% larger than when immersed in a fluid having a pH of 7.0. Human tear fluid has a pH ranging from about 6.5 to about 9.0. As a result of the low pH dependence, lenses formed from the present invention exhibit negligible size change as a result of pH variation of the tear fluid. Further, each lens can be stretched to more than two times its original length without tearing. When the stretching force is released, the lens returns to its original shape without loss of optical properties.

The optimum qualities of low pH dependence and stretchability without tearing result from the combined use of very little cross-linking agent and a small amount of free acid. For optimum physical properties of the lens, the diester content preferably is in the range of 0.15 to 0.25% by weight. Control over the stretchability is obtainable by varying the diester concentration within this acceptable range. The very low pH dependence results when the free acid content in the initial composition is in the preferred range of less than about 1.5% by weight.

The diester used in the present invention preferably is a non-water-soluble alkyl diester containing acrylic or methacrylic groups, but having no free or unreacted hydrophilic groups. The acid preferably is of low molecular weight with an unsaturated double bond. The acid may be the present acid of the hydroxyl alkyl monomer, i.e., acrylic acid or methacrylic acid. Alternatively, other free acids such as vinyl acetic acid, crotonic acid, isocrotonic acid or their homologs may be used. In addition, modified polymers prepared by the addition of comonomers such as allyl alcohol and its homologs are acceptable.

Acceptable diesters having no free hydrophilic groups include, but are not limited to lower alkyl glycol diacrylates and dimethacrylates such as ethylene glycol diacrylate or dimethacrylate, propylene glycol diacrylate or dimethacrylate, butylene glycol diacrylate or dimethacrylate, amylene glycol diacrylate or dimethacrylate, and hexylene glycol diacrylate or dimethacrylate. Also useful is hexane diol diacrylate or dimethacrylate. In addition, lower molecular weight polyethylene glycol diacrylates or dimethacrylates, preferably having a molecular weight of less than 500, also may be employed. For example, these include but are not limited to di-, tri-, and tetra-ethylene glycol diacrylates or dimethacrylates, and to other polyethylene glycol diacrylates or dimethacrylates of the configurations:

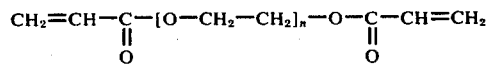

or

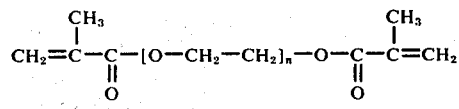

where the average molecular weight of the diester is less than about 500. In these diesters, the number $n$ of polyethylene groups are in a straight chain, aliphatic configuration.

A common feature of all these diesters is that they have no free hydrophilic groups and are non-water-soluble. This is illustrated by ethylene glycol dimethacrylate, which is the diester formed from two molecules of methacrylic acid

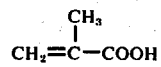

and one molecule of ethylene glycol OH—CH$_2$—CH$_2$—OH. The ethylene glycol itself contains two hydrophilic groups, specifically the hydroxy groups. To form the diester, each of these hydroxy groups reacts with an acid group [—COOH] of a respective methacrylic acid molecule, yielding the product:

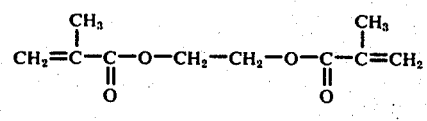

called ethylene glycol dimethacrylate. Note that this diester has no free hydrophilic (hydroxy) groups, and hence is useful in the present invention. Other hydrophilic functional groups include, NH$_2$ and COOH. An example of a diester that is not acceptable in the present invention is that formed from glycerine

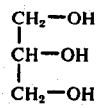

and methacrylic acid. Since only two of the three hydroxy groups would react with acid groups to form the diester, the third hydroxy group would remain unreacted, providing a free hydrophilic group.

The following examples illustrate other compositions within the scope of the invention.

EXAMPLE II

| | |
|---|---|
| Hydroxypropyl methacrylate | 99.40 g. |
| Propylene glycol dimethacrylate | 0.10 g. |
| Methacrylic acid | 0.50 g. |
| Catalyst | 0.08 g. |

EXAMPLE III

| | |
|---|---|
| Hydroxyethyl acrylate | 98.30 g. |
| Ethylene glycol diacrylate | 0.20 g. |
| Acrylic acid | 1.50 g. |
| Catalyst | 0.15 g. |

EXAMPLE IV

| | |
|---|---|
| Hydroxypropyl acrylate | 98.85 g. |
| Propylene glycol diacrylate | 0.15 g. |
| Acrylic acid | 1.00 g. |
| Catalyst | 0.10 g. |

EXAMPLE V

| | |
|---|---|
| Polyethylene glycol monomethacrylate | 98.75 g. |
| Polyethylene glycol dimethacrylate | 0.25 g. |
| Methacrylic acid | 1.00 g. |
| Catalyst | 0.10 g. |

For each example, the hydrophilic gel material exhibited consistent expansion upon hydration, and was useful for the formation of soft contact lenses or other hydrophilic items having good strength, flexibility, expansion and recovery and other desirable characteristics.

The water concentration upon hydration of the inventive terpolymers is established by the percentage of free acid in the starting composition. For example, if the amount of free acid used in the composition of Example I is varied without changing the amount of diester, the following approximate water concentrations are obtained in the hydrated product.

| Weight Percentage of Methacrylic Acid | Weight Percentage of Water in the Hydrated Terpolymer |
|---|---|
| 1% | 47% |
| 2% | 57% |
| 4% | 67% |
| 8% | 77% |

Thus the water concentration appears to be approximately linearly related to the free acid concentration, at least within the percentage range of the foregoing table.

The separate control of hydration percentage using the free acid is a consequence of the free hydrophilic [—COOH] groups in the acid. After polymerization, the hydrophilic groups are-available as hydration sites with an affinity for water. Moreover, they appear to aid in Van der Waal's binding of water to the hydrogel. In contrast to the prior art, the diester cross-linking agent used in the inventive material has no free or unreacted hydrophilic groups. Thus the hydration percentage is substantially uneffected by the diester concentration, but rather is separately established by the free acid concentration.

Note that with the present invention, soft contact lenses can be made having very high water concentration, while retaining good physical properties such as stretchability. This is not possible with prior art hydrogel materials that use a water soluble diester for both physical property and hydration percentage control.

Lenses made in accordance with the present invention, and having water concentrations in the approximate range of from 60 to 80% by weight have the additional benefit that they can be left in the eye for an indefinitely long period of time. The reason is that the exchange of tear fluid with the cornea is not significantly inhibited by the lens. There is little or no tendency for tear fluid to stagnate between the lens and the cornea. However, the increased free acid content required to achieve such high hydration percentages does result in some degradation of pH dependence.

The very high water content causes some reduction in strength.

Compositions in accordance with the present invention may be formed by the distillation of commercially available hydroxy ethyl methacrylate (HEMA). Typical commercial grade HEMA has the following composition:

≥ 96% hydroxyethyl methacrylate
0.5% ethylene glycol dimethacrylate
3.0% methacrylic acid
about 0.1% ethylene glycol
1000 ppm p-methoxyphenol (an inhibitor).

This commercial HEMA is vacuum distilled at a pressure of less than 3 millimeters of mercury, and at a low temperature, preferably less than 85° C. Inhibitors such as methylene blue and hydroquinone may be added in amounts of about 0.1% by weight to prevent polymerization during distillation. As the acid tends to distill off first, an initial portion (approximately 10%) of the distillate is discarded since the free acid concentration in this "forecut" typically is greater than the desired maximum of about 1.5% by weight. Distillation is continued to provide a "main cut" amounting to about 60% of the distillate. Typically, the assay of this main cut will be within the ranges of the present invention. However, should either the free acid or the diester concentration be below the desired ranges, additional acid or diester may be added to obtain the requisite concentration.

Lenses prepared from compositions of the present invention also are useful for medicament release purposes, as by combining a medicine in the aqueous solution used for lens hydration.

Intending to claim all novel, useful and unobvious features shown or described, the applicant claims:

1. As a material for the formation of hydrophilic articles, the composition consisting of:
   a. a major amount of hydroxy alkyl acrylate or methacrylate,
   b. between 0.01 and 0.25% by weight of said composition of a non-water-soluble alkyl diester of acrylic acid or methacrylic acid and having no free hydrophilic groups, and
   c. between 0.5% and about 10% by weight of said composition of a low molecular weight acid having an unsaturated double bond and selected from the group consisting of acrylic acid, methacrylic acid, vinyl acetic acid, crotonic acid and isocrotonic acid.

2. The composition of claim 1 wherein said diester is present in the preferred range of from 0.15 to 0.25% by weight of said composition, said diester functioning as a cross-linking agent.

3. The composition of claim 1 wherein said free acid is present in the range of from 0.5 to 1.5% by weight of said composition.

4. A non-aqueous composition useful for the formation of a hydrophilic terpolymer from which hydrophilic articles can be made, said non-aqueous composition consisting of:
   a. a major amount of hydroxy alkyl acrylate or methacrylate selected from the class consisting of hydroxyethyl acrylate, hydroxypropyl acrylate, hydroxyethyl methacrylate, hydroxypropyl methacrylate, and polyethylene glycol monomethacrylate,
   b. between 0.01 and 0.25% by weight of said composition of an alkyl diester of acrylic acid or methacrylic acid selected from the class consisting of ethylene glycol diacrylate, propylene glycol diacrylate, ethylene glycol dimethacrylate, propylene glycol dimethacrylate, hexane glycol diacrylate, hexane diol dimethacrylate, polyethylene glycol diacrylate having a molecular weight less than about 500, and polyethylene glycol dimethacrylate having a molecular weight less than about 500, said diester being non-water-soluble, and
   c. between 0.5% and about 10% by weight of said composition of a low molecular weight acid having an unsaturated double bond and selected from the group consisting of acrylic acid, methacrylic acid, vinyl acetic acid, crotonic acid and isocrotonic acid.

5. A soft contact lens composed of the polymerization product of the composition of claim 4.

6. A rigid hydrophilic terpolymer consisting of the composition of:
   a. a major amount of a hydroxy alkyl acrylate or methacrylate,
   b. between 0.01 and 0.25% by weight of said composition of a non-water-soluble alkyl diester of acrylic acid or methacrylic acid and having no free hydrophilic groups, and
   c. between 0.5% and about 10% by weight of said composition of a low molecular weight acid having an unsaturated double bond and selected from the group consisting of acrylic acid, methacrylic acid, vinyl acetic acid, crotonic acid and isocrotonic acid, said composition being polymerized with a free radical organic peroxide polymerization catalyst.

7. A process for the formation of hydrophilic gel material from commercial grade hydroxy ethyl methacrylate (HEMA) containing as impurities an alkyl diester having acrylic or methacrylic groups and the free parent acid of said HEMA, said diester consisting of an alkyl glycol diacrylate or dimethacrylate having no free hydrophilic groups, comprising:

distilling said commercial grade HEMA to obtain a distillate consisting of a major amount of hydroxy ethyl methacrylate, less than 0.25% by weight of said diester and less than 10% by weight of said free acid, said distillate being non-aqueous, adding to said distillate sufficient free acid to bring the free acid concentration to a selected value within the range of from 0.5% to about 10% by weight of the composition resultant from said addition of free acid, and polymerizing said resultant composition to provide a rigid hydrophilic gel terpolymer.

8. The process according to claim 7 wherein said distillation comprises vacuum distillation carried out at a temperature of less than about 85° C. and wherein an initial forecut of the distillate is discarded.

9. The process according to claim 7, together with the additional steps of:

mechanically forming a contact lens from said rigid hydrophilic gel terpolymer, and hydrating said lens.

10. A process for forming a soft contact lens, comprising:

providing a non-aqueous mixture of a major amount of hydroxy alkyl acrylate or methacrylate, between 0.01 and 0.25% by weight of said mixture of an alkyl diester of acrylic acid or methacrylic acid, said diester having no free hydrophilic groups, and between 0.5% and about 10% by weight of said mixture of a low molecular weight acid having an unsaturated double bond, said acid being selected from the group consisting of acrylic acid, methacrylic acid, vinyl acetic acid, crotonic acid and isocrotonic acid, polymerizing said mixture with a catalyst to form a sparingly cross-linked, rigid, non-hydrated, hydrophilic terpolymer, mechanically forming an optical contact lens from said rigid hydrophilic terpolymer, and hydrating said lens subsequent to mechanical formation.

11. A contact lens formed by the process of claim 10, and wherein greater than about 2% of said low molecular weight acid is included in said mixture so that the resultant terpolymer has a water concentration of greater than about 57% by weight upon hydration.

12. A process for forming a soft contact lens, comprising:

providing a non-aqueous mixture of a major amount of hydroxy alkyl acrylate or methacrylate, between 0.01 and 0.25% by weight of said mixture of an alkyl diester of acrylic acid or methacrylic acid, and between 0.5% and about 10% by weight of said mixture of a low molecular weight acid having an unsaturated double bond, polymerizing said mixture with a catalyst to form a sparingly cross-linked, rigid, non-hydrated, hydrophilic terpolymer, mechanically forming an optical contact lens from said rigid hydrophilic terpolymer, and hydrating said lens subsequent to mechanical formation, and wherein;

said acrylate or methacrylate is selected from the class consisting of hydroxyethyl acrylate, hydroxypropyl acrylate, hydroxyethyl methacrylate, hydroxypropyl methacrylate, and polyethylene glycol monomethacrylate, wherein;

said non-water-soluble diester is selected from the class consisting of ethylene glycol diacrylate, propylene glycol diacrylate, ethylene glycol dimethacrylate, propylene glycol dimethacrylate, hexane diol diacrylate, hexane diol dimethacrylate, polyethylene glycol diacrylate having a molecular weight below about 500 and polyethylene glycol dimethacrylate having a molecular weight below about 500, and wherein;

said acid is selected from the class consisting of acrylic acid, methacrylic acid, vinyl acetic acid, crotonic acid and isocrotonic acid.

13. A contact lens formed by the process of claim 12 and hydrated to a water concentration of at least 25% by weight.

* * * * *